United States Patent
Miyagi

[11] 3,901,528
[45] Aug. 26, 1975

[54] BABY CARRIAGE
[76] Inventor: Takeshi Miyagi, 47, Mikuriya Nishinomachi, Higashi Osakashi, Osaka, Japan
[22] Filed: Apr. 5, 1973
[21] Appl. No.: 348,148

[52] U.S. Cl............................. 280/36 B; 280/41 B
[51] Int. Cl............................................. B62b 11/00
[58] Field of Search........... 280/36 B, 41 B; 297/16, 297/30, 46, 53, 54

[56] References Cited
UNITED STATES PATENTS
2,567,464  9/1951  Bancroft........................... 280/41 B
3,390,893  7/1968  MacLaren................... 280/36 B X
3,627,342  12/1971  Morellet........................... 280/36 B
3,653,681  4/1972  Virtue.............................. 280/36 B FOREIGN PATENTS OR APPLICATIONS
549,836  12/1942  United Kingdom............... 280/36 B Primary Examiner—David Schonberg
Assistant Examiner—Michael J. Forman
Attorney, Agent, or Firm—Eyre, Mann & Lucas

[57] ABSTRACT

A collapsible baby carriage is disclosed. The front and back legs are so connected to the arm rest bar and the handle bar that the entire assembly can be folded to a compact unit wherein the handle bar can be used as a carrying handle for the collapsed structure.

7 Claims, 3 Drawing Figures

BABY CARRIAGE

This invention relates to a baby carriage capable of folding into a handy and compact size when a baby or luggage is not carried thereon.

More specifically, the invention is concerned with a portable carriage for carrying a baby or a luggage, which is constructed with pipes or any similar material in such a manner that the entire body is readily folded or unfolded by a simple procedure. Thus, the convenience for carrying the carriage is immensely enhanced.

The invention will be described more particularly by way of example, with reference to the accompanying drawings, in which.

Figure 2:
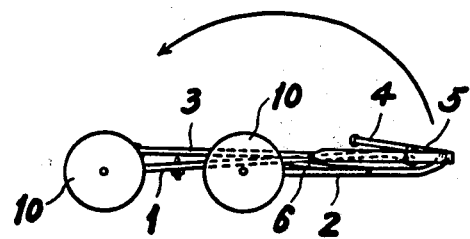
FIG. 2 is a side view of the folded baby carriage according to the present invention.
Figure 3:
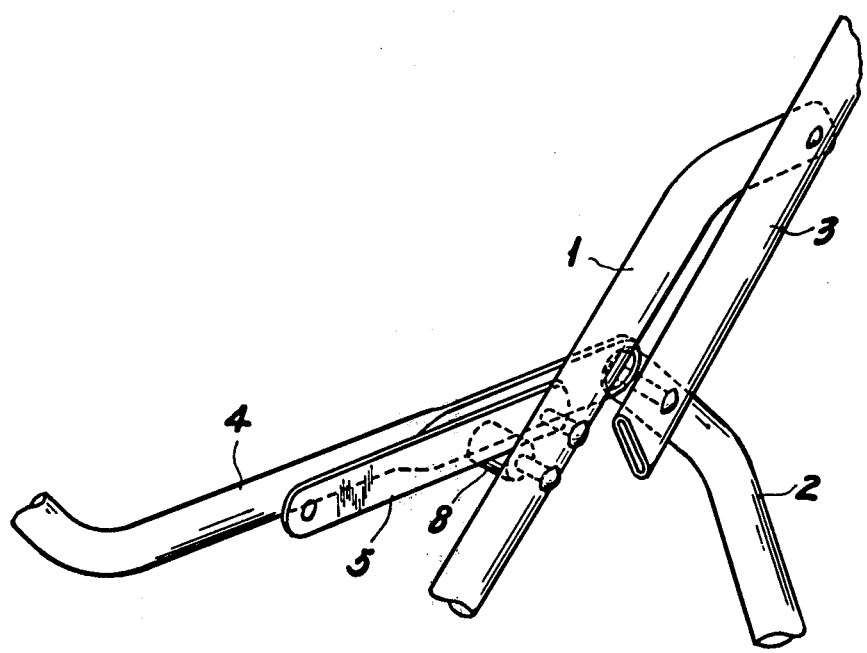
FIG. 3 is a perspective view in enlarged scale showing the main part of the baby carriage illustrated in FIG. 1.

A body (A) consists essentially of a pair of front legs 1, a U-letter shaped handle or pushing bar 3, and a pair of rear legs 2. The front legs 1 are respectively pivotably jointed to points spaced from the lower extreme ends of the handle bar 3, in which extreme ends, in turn, the rear legs 2 are pivotably jointed, such that the end face of the latter is in abutment with the circumferential surface of the front legs 1 when the carriage is unfolded for practical use, as shown in FIG. 2. Between the front legs and the rear legs, there are connecting rods 6 pivotably supported thereto.

The front legs 1 are provided with a U-letter shaped arm rest bar or frame 4 serving to protect a baby from falling off the carriage. The arm rest bar 4 is also pivotable in relation to the front legs 1. Preferably, the arm rest bar 4 is pivotably jointed adjacent to the joint point of the handle bar 3 and the rear legs 2. The arm rest bar may be made of two independent rods, but it must be noted that the arm rest bar 4 functions as a handle when the carriage is to be folded, which will be described hereinafter.

Between the arm rest bar 4 and the front legs 1, there is an intermediate bar 5, one end of which is pivotably connected to the arm rest bar 4 and the opposite end is pivotably connected to the front leg 1. The front leg 1 has a stopping means 8 projecting inwardly to prevent the arm rest bar 4 from rotating in the counter-clockwise direction when the carriage is unfolded for use.

The front legs 1 and the rear legs 2 are respectively provided with wheels 10, and, in addition, a prefabricated bag 9 is fastened to the front legs 1, the rear legs 2 and the handle bar 3 in a known manner. Below the bag 9 thus attached, there is provided a foot step 7, which is preferably covered with an extended portion of the bag 9.

Figure 1:
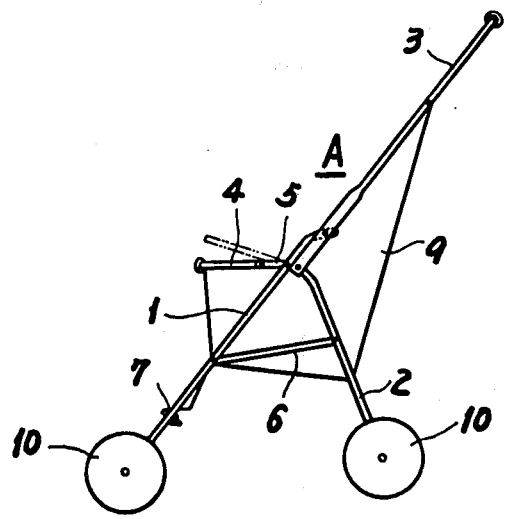
FIG. 1 is a side view of a baby carriage according to the present invention.

The baby carriage thus constructed is folded and unfolded as follows:

When the baby carriage is to be folded into the condition shown in FIG. 2, the arm rest bar 4 is raised or pulled back around the pivotal point of the front legs 1 and the rear legs 2, as indicated by the dotted lines in FIG. 1, thereby causing the intermediate bar 5 to follow the upward movement of the arm rest bar 4. Thus, the arm rest bar 4 is released from the stopping means 8, whereby the handle bar 3 is in a position to rotate in the counter-clockwise direction in relation to the pivotal point of the front legs and the handle bar, as indicated by an arrow in FIG. 2. In this way when the handle bar 3 is folded over the front legs 1, the arm rest bar 4 is in turn caused to follow the counter-clockwise movement of the handle bar, and is equally overlaid over the front legs 1. On the other hand, the rear legs 2 are rotated in the clockwise direction in relation to the pivotal point of the handle bar and the rear legs, until the rear legs are placed in contact with the front legs, as shown in FIG. 2. Thus the baby carriage is folded into a compact and flat shape, which is easy for a woman to carry, or which is easy to bring into a motor car and a train.

When the baby carriage thus folded is unfolded, the grip portion of the handle bar 3 is initially raised or pulled back to some extent, where the arm rest bar 4 is jointly raised. When the front legs and the handle bar are straightened up in relation to the pivotal point therebetween, the end face of the rear legs 2 is put into abutment with the circumferential surface of the front legs 1. Accordingly, the handle bar 3 is secured against a further clockwise movement thereof; however, stability will be derived from the further clockwise movement. Finally the arm rest bar 4 is lowered to lock the handle bar 3, whereby the latter is secured in its proper position.

The extreme end portion of the handle bar 3 can be provided with a metal plate rigidly connected thereto, which, in turn, is pivotably connected to the rear legs 2. In the example illustrated the front legs and the handle bar are pivotably jointed with the use of a suitable pin (not shown), but alternatively, they can be connected by means of a ring, a hook, a clip, or any similar means.

According to the present invention, a baby carriage has an advantage that it can be folded simply by the initial operation of the arm rest bar 4. When the carriage is folded it takes a handy shape. In addition, the carriage can be made of light material, such as light metal pipes.

What is claimed is:

1. A foldable baby carriage having folded and unfolded positions comprising:
   a. a pair of front legs each of which has a first end attached to a wheel and a second end for pivotal attachment;
   b. a pair of rear legs each of which has a first end attached to a wheel, a second end for pivotal attachment and an abutting face on second end;
   c. a pair of handle bar legs each having a first end for attachment to a handle and a second end for pivotal attachment;
   d. a pair of arm rest bars each having a first end for attachment to an arm rest and a second end for pivotal attachment;
   e. the second end of each front leg being pivotably connected to a handle bar leg at a point spaced from the second end of the handle bar leg;
   f. the second end of each rear leg being pivotably connected to a handle bar leg at a point closer to the second end thereof than the point of attachment of the front leg to the handle bar leg;
   g. the attachment and configuration of the said front and rear legs being such that the abutting face on the second end of each said rear leg abuts the periphery of a front leg when the carriage is in its unfolded position;

h. the second end of each arm rest bar being pivotably connected to a rear leg and a handle bar leg at the same point that the rear leg and the handle bar leg are pivotably connected to each other;

i. means attached to each front leg at a point spaced from the second end thereof and to each arm rest bar at a point spaced from the second end thereof to prevent unintentional collapsing of the carriage in its unfolded position;

j. a prefabricated bag attached to each said front leg, each said handle bar leg and each said arm rest bar;

k. a handle bar attached to the first end of each said handle bar leg; and l. an arm rest attached to the first end of each said arm rest bar.

2. The foldable baby carriage of claim 1 further comprising a connecting rod pivotably attached to each front leg and each rear leg at a point intermediate the first and second ends thereof.

3. The foldable baby carriage of claim 1 wherein the cooperating means to prevent unintentional collapsing comprises an elongated plate pivotably connected to the first leg at a point further removed from the second end than the point of abutment of the abutting face of the second end of the rear leg with the periphery of the front leg and pivotably connected to the arm rest bar at a point spaced from the second end thereof, said plate when the baby carriage is in its unfolded position abutting stop means mounted on said front leg at a point more remote from the second end of said front leg than the point of attachment of the said elongated plate to the said front leg.

4. The foldable baby carriage of claim 1 wherein the said pair of handle bar legs are joined together at their first ends.

5. The foldable baby carriage of claim 4 wherein said handle bar legs are both formed from a single piece of material.

6. The foldable baby carriage of claim 1 wherein the said pair of arm rest legs are joined together at their first ends.

7. The foldable baby carriage of claim 6 wherein said arm rest legs are both formed from a single piece of material.

\* \* \* \* \*